Jan. 5, 1954　　　　　H. G. STARCK　　　　2,665,091
BREATHER TUBE
Filed May 28, 1951
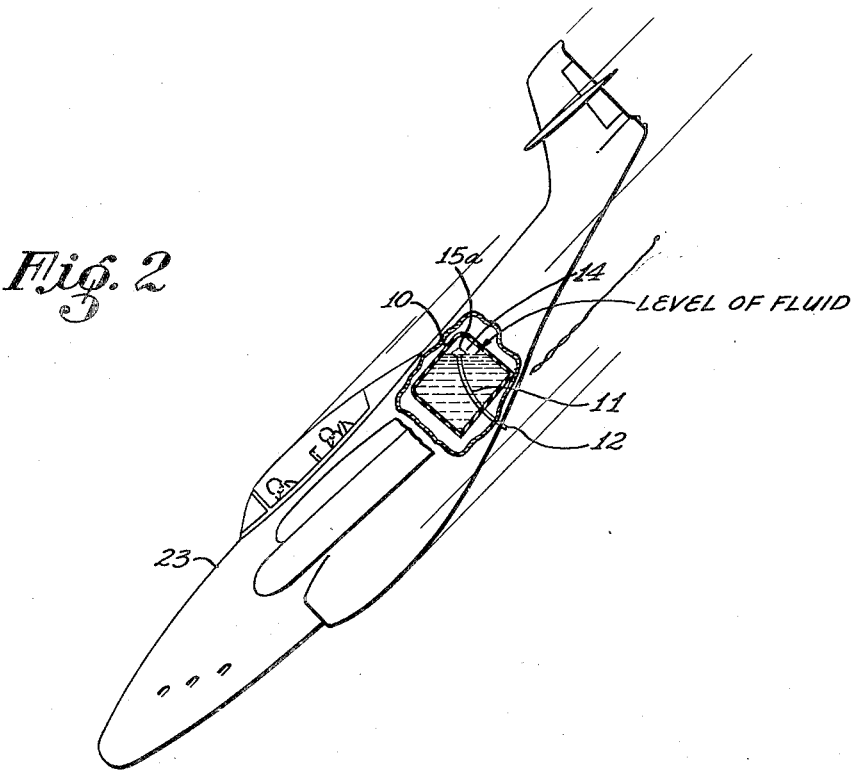
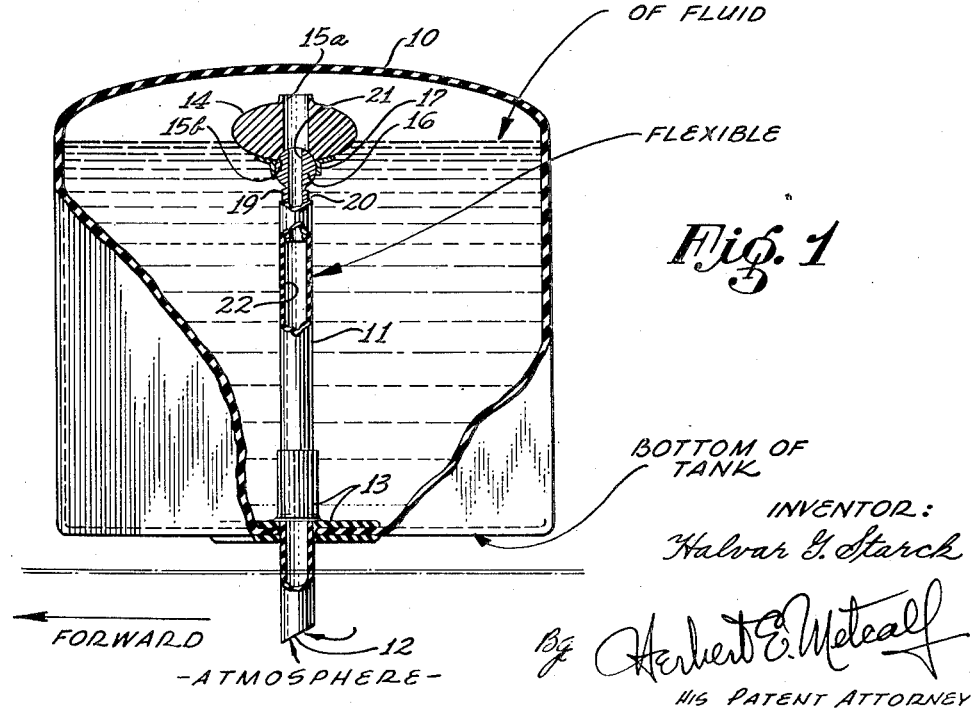
INVENTOR:
Halvar G. Starck
By Herbert E. Metcalf
HIS PATENT ATTORNEY Patented Jan. 5, 1954

2,665,091

UNITED STATES PATENT OFFICE 2,665,091

BREATHER TUBE

Halvar G. Starck, Redondo Beach, Calif., assignor to Northrop Aircraft, Inc., Hawthorne, Calif., a corporation of California Application May 28, 1951, Serial No. 228,639

2 Claims. (Cl. 244—135)

The present invention relates to the venting of fluid storage tanks.

It is usually advisable to vent fluid storage tanks to enable air from outside the tank to enter a fluid storage tank as fluid is withdrawn therefrom, so that equal pressures outside and inside the tanks are maintained.

A problem which has confronted the designers of aircraft has been that of designing fuel storage tanks wherein vent openings will remain above the level of the fuel during all attitudes of the aircraft in flight.

With this in mind, the breather tube of the present invention has among its main objects the advantage of maintaining tank vent openings above the level of the fuel in a tank at all times, irrespective of the position of the tank with respect to the fuel stored therein.

Briefly, the breather tube of the present invention, in one preferred embodiment, comprises a flexible tube having one end thereof open to atmosphere, the other end thereof extending through the wall of the tank and having the tube opening positioned above the maximum fuel level therein. The tank vent opening is connected to a floatable member having an axial air passage therethrough, by a ball and socket assembly which is also provided with an axial air passage therethrough; the air passages of the floatable member and the ball and socket connection being continuous with the tube passage. Air enters the tank, or vapor is allowed to escape from the tank through the flexible tube, the inner opening of which is maintained above the level of the fuel by the floatable member.

Inasmuch as the embodiment of the present invention chosen for illustration, herein relates to aircraft, the principles involved will be more easily understood by reference to the specification drawings wherein:

Figure 1 is a side elevational view of an airplane storage tank partly in section to show the construction of the breather tube in the specific embodiment described above.

Figure 2 is an elevational view of a diving aircraft which is cut away to show the fuel tank in section, showing the position of the vent tube with respect to the level of the fuel in the tank.

An aircraft fuel storage tank 10, as shown in Figure 1, is provided with a flexible breather tube 11 which is passed through the wall at the bottom of the tank 10. The lower end of the tube 11 has its opening 12 positioned in atmosphere. The diameter of the tube 11 is determined by the size of the tank 10 and the rate of fuel withdrawal therefrom. The tube 11 should be flexible enough to freely move on a fixed base like a buoy cable, in the fuel as the tank 10 changes position with respect to the level of the fluid during the flight of the aircraft. However, the tube 11 should be resilient enough so that looping, kinking, or collapsing thereof is prevented. The normal position of the breather tube 11 in a full tank during level flight is as shown in Fig. 1, wherein the tube 11 is perpendicular to the bottom of the tank 10. As the tank 10 is emptied, the tube moves toward one side of the tank, the floatable member 14 maintaining the vent opening at the top, and eventually comes to rest against the tank wall 10.

A base member 13, vulcanized and sealed in the wall of the tank 10, can be used to fasten the breather tube 11 in position as shown for example in Fig. 1.

A hollow float member 14, which can be molded from a relatively lightweight plastic material which is impervious to aromatic fuel such as phenolic resin for example, is provided with openings 15a and 15b at the top and bottom thereof respectively, and is connected at the end of the breather tube 11 which is positioned above the level of the fuel by means of a ball member 16. The lower opening 15b of the float member 14 is provided with a socket 17 which fits around a portion of the periphery of the ball member 16 which is movable therein. The shank 19 of the ball member 16 is closely fitted into the upper opening 20 of the breather tube 11 and tightly sealed therein.

An axial air passage 21 is bored through the ball member 16 and is continuous with tube passage 22.

When an aircraft 23 is in an attitude other than level flight, as shown in Figure 2, the fuel tank 10 accordingly assumes a position, with respect to the level of the fluid stored therein, which would usually cover vent openings placed in the tank wall at the top of the tank as has been the practice in many instances.

With the breather tube 11 of the present invention, however, the float 14 member remains on the surface of the fluid, at all times, regardless of the attitude of the aircraft 23, the vent opening 15a in the tank 10 venting the tank 10 during normal flight attitudes of the aircraft 23.

While in order to comply with the statute, the invention has been described in language more or less specific as to structural features, it is to be understood that the invention is not limited to the specific features shown, but that the means and construction herein disclosed comprise the preferred form of putting the invention into effect, and the invention is therefore claimed in any of its forms or modifications within the legitimate and valid scope of the appended claims.

What is claimed is:

1. A breather tube for venting an aircraft fuel tank from full to empty, comprising a flexible tube, the opening at one end of said tube being positioned in atmosphere, the opening at the other end of said tube being positioned in said tank above the level of fluid stored therein, to provide a continuous unobstructed air passage between the interior of said tank and atmosphere, a floatable member connected to said tube opening in said tank by a freely movable ball and socket assembly, said floatable member and said ball and socket assembly each having a central air passage therethrough normally axial of said tube and continuous therewith, said floatable member maintaining said opening in said tank above said fluid level irrespective of the position of said tank with respect to said fluid during flight of said aircraft.

2. A breather tube for venting an aircraft fuel tank from full to empty, comprising a flexible tube, the opening at one end of said tube being positioned in atmosphere, said flexible tube passing through the bottom of said tank and normally extending straight upwardly therein, the opening at the other end of said tube being positioned in said tank above the level of fluid stored therein to provide a continuous unobstructed air passage between the interior of said tank and atmosphere, a floatable member having an air passage therethrough, a ball and socket assembly connecting said floatable member with said tube end in said tank, said ball member having an air passage therethrough axial of said tube air passage and said floatable member air passage and continuous therewith, said floatable member being movable on said ball member in accordance with movement of said fluid to retain said tube opening above the level of said fluid, irrespective of the position of said tank with respect to said fluid during flight of said aircraft.

HALVAR G. STARCK.

References Cited in the file of this patent

UNITED STATES PATENTS

| Number | Name | Date |
|---|---|---|
| 1,636,540 | Wiggins | July 19, 1927 |
| 1,744,640 | Kniel | Jan. 21, 1930 |
| 1,871,055 | Hasbrouck | Aug. 9, 1932 |
| 1,982,441 | Loweke | Nov. 27, 1934 |
| 2,063,084 | Farnon et al. | Dec. 8, 1936 |
| 2,475,834 | Harvey | July 12, 1949 |